Sept. 20, 1971 G. J. BETZ 3,606,381
COMBINATION SPARE WHEEL HOLDER AND STEP FOR PICKUP TRUCKS
Original Filed May 31, 1968 2 Sheets-Sheet 1

INVENTOR.
GEORGE J. BETZ
BY Eugene M. Eppelman
ATTORNEY

Sept. 20, 1971 G. J. BETZ 3,606,381
COMBINATION SPARE WHEEL HOLDER AND STEP FOR PICKUP TRUCKS
Original Filed May 31, 1968 2 Sheets-Sheet 2
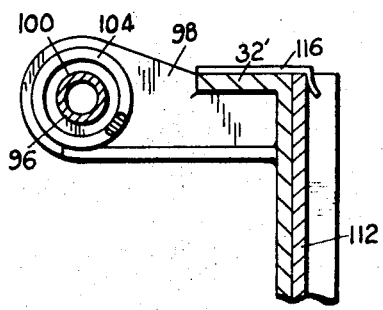
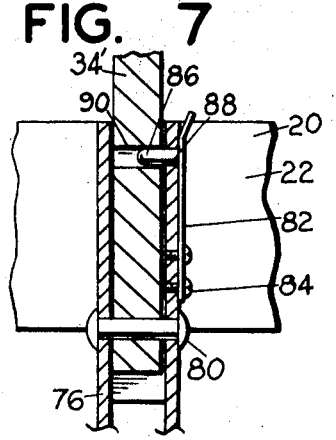
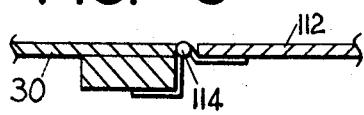
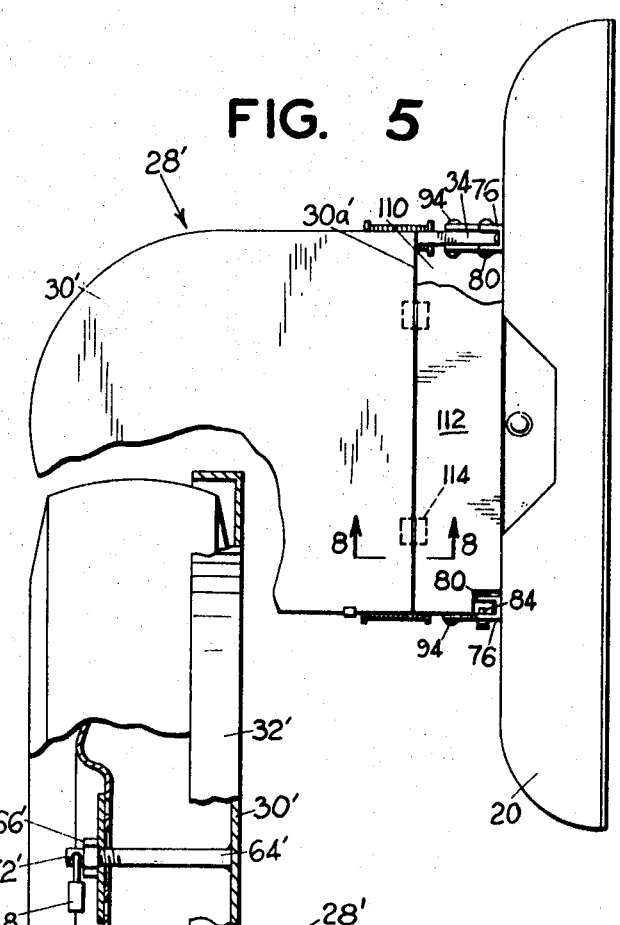
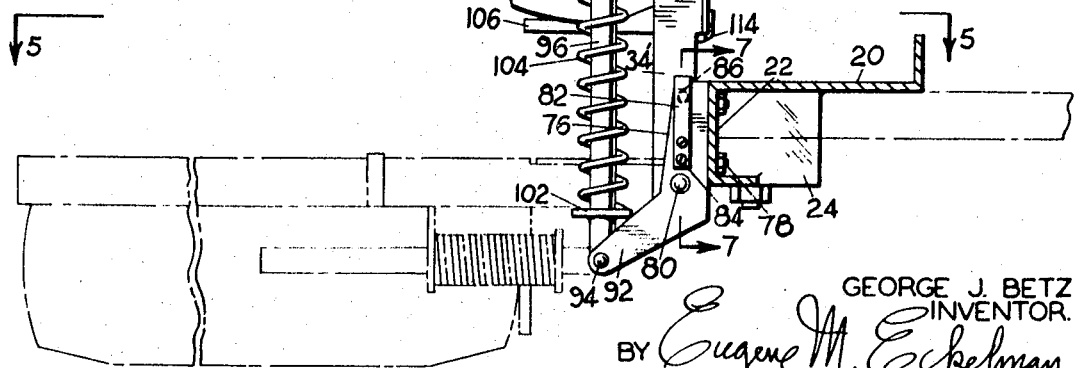
GEORGE J. BETZ
INVENTOR.
BY Eugene M. Eckelman
ATTORNEY United States Patent Office
3,606,381
Patented Sept. 20, 1971

3,606,381
COMBINATION SPARE WHEEL HOLDER AND
STEP FOR PICKUP TRUCKS
George J. Betz, 4720 NE. 31st Ave.,
Portland, Oreg. 97211
Application May 31, 1968, Ser. No. 736,926, now Patent No. 3,507,514, dated Apr. 21, 1970, which is a continuation-in-part of application Ser. No. 654,776, July 20, 1967. Divided and this application June 12, 1969, Ser. No. 870,719
Int. Cl. B60r 3/02
U.S. Cl. 280—164          6 Claims

ABSTRACT OF THE DISCLOSURE

A wheel holder has a threaded lug and supporting arm for securing a spare wheel flatwise thereagainst. This holder has lower extension capable of being pivotally connected to a utility bumper of a pickup truck. A spring-operated catch is used for maintaining the wheel holder in a vertical position and when released allows the holder to lower to a horizontal position. The vertical supporting position of the body member comprises the normal or traveling position, and the horizontal position comprises a position for use as a step. In a first embodiment the spring catch is engageable with a detent on the bumper for maintaining the holder in its vertical position and forms a part of a cross shaft having a foot lever for rotating the shaft to a release position of the catch. A second embodiment has a pair of bumper brackets to which the holder is pivotally attached. In this latter embodiment, the bumper brackets also pivotally support a pair of rods slidable in guide brackets on the holder and having compression springs supported thereon to oppose lowering rotative movement of the holder.

This is a division of the patent application of George J. Betz, Ser. No. 736,926, filed May 31, 1968, now Pat. No. 3,507,514 issued Apr. 21, 1970, for Combination Spare Wheel Holder and Step for Pickup Trucks, in turn a continuation-in-part of application Ser. No. 654,776, filed July 20, 1967, now abandoned, for Combination Spare Wheel Holder and Step for Pickup Trucks.

BACKGROUND OF THE INVENTION

This invention relates to new and useful improvements in spare wheel holders for pickup trucks and more particularly is concerned with such a holder which can also serve as a step.

In the conventional pickup-type truck, the spare wheel is generally carried on one side of the vehicle or is suspended under the frame. When the wheel is carried on the side of the vehicle it is in the way for proper use of the vehicle such as in loading and unloading. When the spare wheel is carried underneath the vehicle, it is difficult to mount and demount in the event of a flat tire. Also, various types of rear steps have been provided for pickup-type campers to assist persons in gaining access to a rear door of the camper. Such steps generally are releasably attached to the pickup truck or are permanently attached and swung up into the camper housing when not in use.

The present invention is intended to overcome the difficulty in carrying a spare wheel on pickup-type trucks and at the same time to provide a spare wheel holder which can be used as a step.

Another objective thereof is to provide a spare wheel holder of the type described having means facilitating its mounting on the rear bumper of a pickup-type truck.

Still another object is to provide a combination spare wheel holder and step for pickup-type trucks which supports the spare wheel in a conveniently accessible position and in addition does not interfere with use of the pickup. In addition, the present structure is designed such that even though it is attached to the bumper of a truck, it does not interfere with the use of a trailer hitch on the bumper.

Another object is to provide a combination spare wheel holder and step for pickup-type trucks which is designed for attachment to most types of utility bumpers now in use on such trucks, and also to provide such a structure having a novel latch mechanism for supporting the holder and step in a vertical position.

BRIEF DESCRIPTION OF THE DRAWINGS

FIG. 4 is an elevational view of a second form of the invention, a portion of this figure being broken away;

FIG. 5 is a plan view of the invention taken on the line 5—5 of FIG. 4 but showing the holder in a horizontal position;

FIGS. 6 and 7 are enlarged fragmentary sectional views taken on the lines 6—6 and 7—7 of FIG. 4, respectively; and FIG. 8 is an enlarged fragmentary sectional view taken on the line 8—8 of FIG. 5.

DESCRIPTION OF THE PREFERRED EMBODIMENTS

Figure 3:
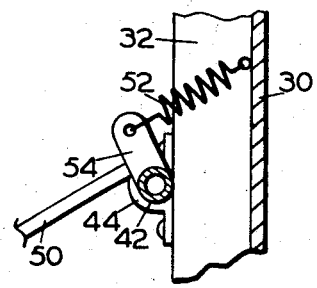
FIG. 3 is an enlarged fragmentary sectional view taken on the line 3—3 of FIG. 1.
Figure 2:
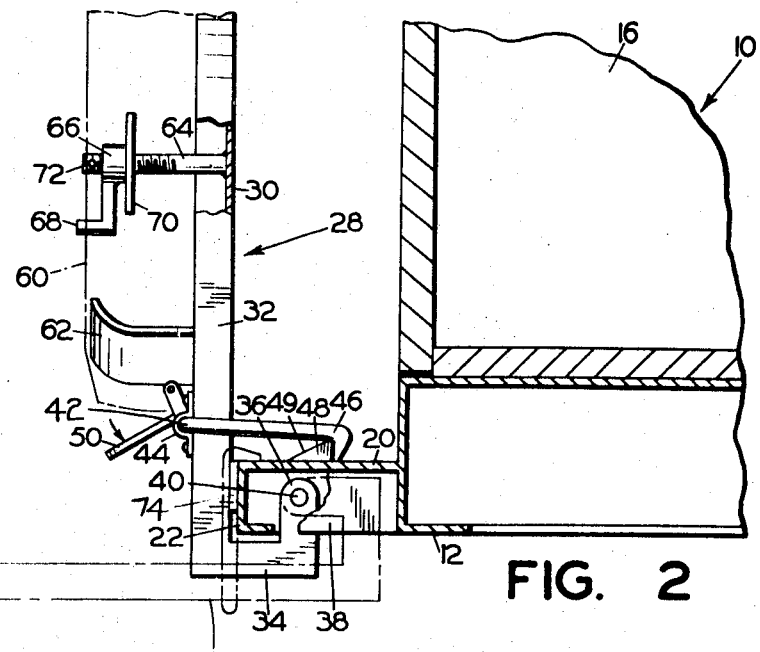
FIG. 2 is a fragmentary elevational view, also partly broken away, taken on the line 2—2 of FIG. 1.
Figure 1:
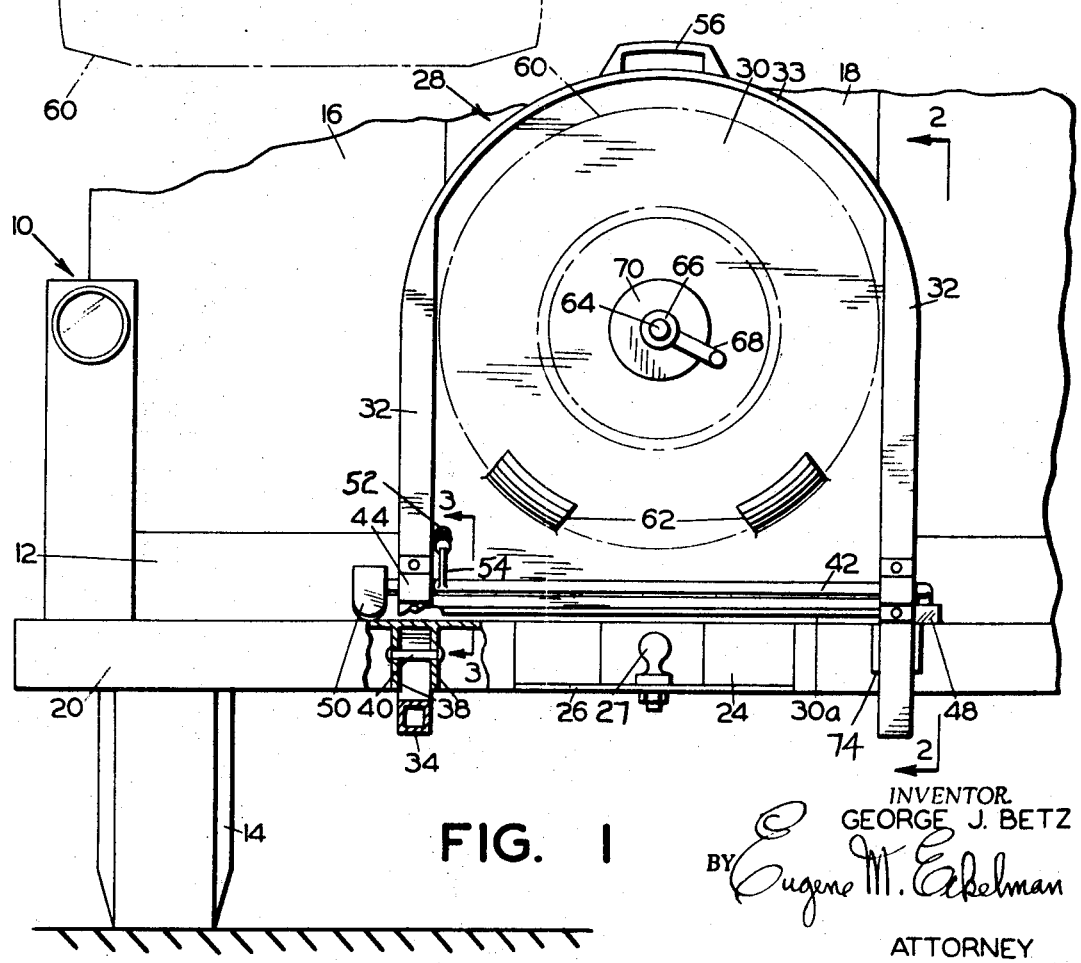
FIG. 1 is a fragmentary elevational view of a pickup-type truck showing a first embodiment of the present combination spare wheel holder and step attached thereto, this view being partly broken away.

Referring in particular to the drawings and first to FIGS. 1-3 which show a first embodiment of the invention, the numeral 10 designates generally a pickup-type truck having frame means 12 and wheels 14. For purposes of illustration, a camper housing 16 is shown mounted in position on the truck. In the usual case such housing has a central rear door 18. The present invention, as will be seen hereafter, was designed for use with a widened bumper 20 which is in common use at the present time and referred to in the trade as a utility bumper. This type of bumper has a front depending flange 22 and a front, central recessed portion 24 provided with a bottom wall 26 on which is mounted the ball portion 27 of a trailer hitch. By means of the recess 24, the portion 27 of the trailer hitch is disposed within the general outline of the bumper.

The present invention comprises a body member or holder 28 which includes a plate 30 of sufficient rigidity to form a step in a horizontal position of such body member. This plate is secured to angle iron, side frame members 32 and an upper reinforcing connecting frame strip 33. Side frame members 32 have bottom right angle extensions 34, and each of said extensions has an upturned end or ear 36, thus forming an L-shaped portion capable of attaching the body member 28 to a vehicle bumper.

For the purpose of attaching the said body member to a bumper 20, the latter is provided with two pairs of depending ears 38 on the underside thereof. These ears are disposed rearwardly of the flange 22 and at selected spaced relation from each other for pivotal support, by means of pivot pins 40, of the extensions 36 of the wheel holder and members 32. As apparent in FIG. 2, the L-shaped structure of the bottom portion of the frame members 32 permits the wheel holder and step to be pivoted on the pins 40 between a vertical position, shown in full lines in FIG. 2 and a horizontal position, shown in phantom lines in the same figure.

Structure for latching the body member in its two positions comprises a cross shaft 42 having journaled support 44 on the side frame members 32 and terminating at one end in a rearwardly extending catch or dog 46 adapted to engage a detent 48 welded or otherwise secured to the top of the bumper 20. The opposite end of cross shaft 42 from the dog 46 terminates in a foot pedal or lever 50 which projects rearwardly and is arranged to be engaged by the operator's foot for the purpose of disengaging the catch from its detent 48. The catch 46 is urged in a clockwise latching direction, FIG. 2, by means of a tension spring 52, FIG. 3, connected between an integral upwardly projecting lug 54 on the shaft 52 and the body member 28.

The parts are arranged such that in the vertical position of the body member 28, the dog 56 engages detent 48 to hold such body member securely in an upright position. The spring holds the dog 46 in a positive latched engagement with its detent. If the dog is not fully hooked it will work itself into a fully latched position under the action of the springs when the body member vibrates from the motion of the truck.

The body member will rotate counterclockwise, FIG. 2, when the dog 46 is released from its detent 48 and is stopped in about a horizontal position as shown in phantom lines by engagement of the dog 46 with the rear upper edge of the bumper. As the body member is being lowered to its horizontal position, the spring 52 urges the shaft 42 in a clockwise direction, FIG. 2, to maintain the dog 46 in firm engagement with the bumper so that it will catch on the back edge thereof. To move the body member 28 from its vertical position to its horizontal position, it is necessary to step on the foot pedal 50 to release the dog 46 from its detent 48. To move the holder from its horizontal position to its vertical position, however, it is merely necessary to pull it up to a position such that the dog 46 catches behind detent 48. Detent 48 has an inclined forward edge 49 by means of which the dog 46 rides up to its catch position.

The upper end of the body member 28 has a handle 56 for convenience in raising and lowering the holder.

A spare wheel 60 is detachably secured to the body member 28, and for this purpose the holder has a pair of cradle arms 62 at the bottom for supporting the wheel. In addition, a threaded stud 64 is secured to the plate 30 for attachment to the wheel centrally thereof. Secured connection of the stud 64 to the wheel is accomplished by a nut 66 having a crank handle 68 thereon, the nut being used in combination with an anchor plate 70 to engage the wheel on the body member. Stud 64 has a diametral bore 72 adjacent its outer end for receiving suitable locking means, such as a padlock, to prevent wrongful removal of the spare wheel.

Rubber blocks 74 are disposed between the rear surface of the bumper and opposite sides of step plate 30 to provide a cushioned abutment between these members in the up position of the holder. These blocks may be secured on either member but preferably are secured on the bumper.

In the use of the present invention, the holder will be latched in its upright position when the truck is on the road or at times when access to the rear of the truck is not desired. When such access is so desired, however, the operator first grasps the handle 56 and then releases the dog 46 by stepping on the pedal 50. The holder is then lowered manually to a point where the dog 46 catches on the back edge of the bumper to hold the body member in a horizontal position. The holder is thus usable as a step, the plate 30 forming the stepping surface.

A second embodiment of the invention is illustrated in FIGS. 4 through 8. This embodiment similarly is arranged for attachment to a utility bumper 20 having a front depending flange 22 and a central recess portion 24 in which is mounted to ball portion of a trailer hitch as in FIG. 1. The holder of the present embodiment is designated generally by the numeral 28' and includes a plate 30' having an integral forwardly facing side frame member or flange 32'. This side frame member has a bottom extension 34' on each side each projecting into a channel-shaped bumper bracket 76 secured to the front surface of bumper flange 22 as by bolts 78. The lower ends of the side frame extensions 34' are pivotally connected in their respective bumper brackets 76 by pivot pins 80 whereby the wheel holder is arranged to be pivoted between a vertical position as shown in full lines in FIG. 1 and a horizontal position as shown in phantom lines in the same figure. The holder is held in its upright or vertical position by latch means comprising a spring finger 82, best seen in FIG. 7, secured at its lower end, as by screws 84, to an outer surface of one of the brackets 76 and having a latch pin 86 on its upper end projecting freely through an aperture 88 in the wall of the bracket and arranged for latching engagement in an aperture 90 in a side frame extension 34'. By manually pulling the upper end of the spring finger 82 outwardly from the bracket 76 the pin 86 is disengaged from the aperture 90 to allow the wheel holder to be lowered.

Each of the bumper brackets 76 has a bottom angled extension 92 to which is pivotally connected, by a pivot pin 94, one end of a rod 96. A guide bracket 98, shown in detail in FIG. 3, is secured to the plate 30' and side frames 32 at right angles thereto and substantially in alignment with the bumper brackets 76. Each guide bracket 98 has an aperture 100 for slidably receiving a respective one of the rods 96 whereby when the wheel holder is lowered the rods slide through their brackets. Mounted on the rods 96 and abutted between the lower surface of guide brackets 98 and a lower abutment flange 102 are compression springs 104 which serves to oppose the downward pivoting movement of the holder. That is, as the holder is pivoted toward its horizontal position, guide brackets 98, in view of the spacing of the pivoted connections 80 and 94, advance closer to the pivoted connection 94 and compress the springs 104 which as stated oppose the pivoted lowering movement of the holder. The strength of the springs is such that while the weight of the older is greater than the opposing force thereof, such springs nevertheless will provide a gentle lowering speed.

For the purpose of suppporting a spare wheel 60 on the holder one or more integral arms or brackets 106 are secured to the plate 35 and project outwardly for bearing the weight of the wheel. In addition, a threaded stud 64' is secured to the plate 30' for projecting through the central aperture of the wheel and arranged to receive a nut 66'. As in the first embodiment, stud 64' has a diametral bore 72' adjacent its outer end. As illustrated in FIG. 4 a lock 108 may be used to prevent unauthorized removal of the wheel.

Extensions 34' of the side frame 32' are of a length such that when the holder is in an upright position the inner or lower edge 30a' of the plate 30' is sufficiently above the bumper to permit a trailer to be hitched to the bumper. In the lowered position of the holder, an opening or space 110, FIG. 2, thus exits between the inner edge 30a' of the plate 30' and the front edge of the bumper, and to cover this opening when the holder is down, the present embodiment employs an auxiliary plate 112 pivotally connected by hinges 114 to the plate 30' and arranged to lie over said opening in a plane level with the upper surface of the bumper. The plate 112 is supported on the top edges of the brackets 76 when in its down position. It is desired that the auxiliary plate 112 be supported in an out of the way position when the wheel holder is upright, and for this purpose a spring finger latch 116, FIG. 6, is secured at one of its ends to the side frame member 32' and arranged to have latching engagement over an edge of the plate 112. Latch finger 116 is released manually to permit the plate 112 to be swung to its horizontal use position.

In the operation of the embodiment of FIGS. 4–8, the wheel holder will be normally maintained in its vertical position as shown in full lines in FIG. 1. In this position, latch 82 engages the holder for maintaining the latter in its upright position. Auxiliary plate 12 is also held in its upright position against the back side of plate 30' by latch 116. When it is desired to use the wheel holder as a step, latch 86 is released whereby the holder is free to pivot rearwardly to its horizontal position. Springs 104 cause slow pivoting descent of the holder. With the holder in its horizontal position, the plate 112 is released from its latch to cover the space 110 between the plate 30' and the bumper. When it is desired to raise the holder, the plate 112 is latched in the position shown in FIG. 1 and the holder manually rotated to its upright position. In raising the holder the springs 104 serve as balancing springs to assist the operator.

In addition to providing a combination wheel holder and step, the present mechanism has the feature that it supports the spare wheel in an easily accessible position. In addition, such spare wheel is not in the way of the load in the truck and further yet such holder in its upright position serves as a safety stop for accidental opening of the camper door 18 when the truck is traveling.

It is to be understood that the forms of my invention herein shown and described are to be taken as preferred examples of the same and that various other changes in the shape, size and arrangement of parts may be resorted to without departing from the spirit of my invention or the scope of the subjoined claims. For example, although the apparatus of the invention is illustrated in combination with a pick-up type truck, it is to be understood that it can be used with any type vehicle.

Having thus described my invention, I claim:

1. In combination, a spare wheel holder and horizontal platform-type vehicle bumper having a rear edge, said wheel holder comprising a body member having a frame supporting a substantially flat step surface on one side thereof, means on the other side of said body member from said step surface for detachably supporting a spare wheel thereon, and an angular extension on the lower end of said body member projecting from the step side thereof, said angular extension being pivotally attached to the underside of said bumper whereby said body member is rotatable between an upright position and a substantially horizontal position, said flat step being arranged to face upwardly in the horizontal position of said body member to serve as a step.

2. The combination wheel holder and step of claim 1 including latch means interengageable between said body member and said bumper releasably holding said body member in its upright position.

3. The combination wheel holder and step of claim 1 including latch means interengageable between said body member and said bumper releasably holding said body member in its upright position and its horizontal position.

4. The combination wheel holder and step of claim 1 wherein said latch means comprises a hook on said body member and a detent arranged for securement to said bumper, said hook being arranged to engage said detent to hold said body member in its upright position and to engage the rear edge of the bumper to hold said body member in its horizontal position.

5. The combination wheel holder and step of claim 1 wherein said latch means comprises a cross shaft journaled on said body member, a hook on said shaft, a detent arranged for securement to said bumper, said hook being arranged to engage said detent to hold said body member in its upright position and to engage the rear edge of the bumper to hold said body member in its horizontal position, and an operating lever on said shaft for releasing said hook from the detent.

6. The combination wheel holder and step of claim 1 wherein said body member includes a step plate on said frame, the end of said step plate toward the bumper attaching connection being spaced from said connection in an amount such that in the upright position of said body member the said end of the step plate is disposed above a portion of the bumper.

References Cited
UNITED STATES PATENTS

| | | | |
|---|---|---|---|
| 1,223,639 | 4/1917 | Swartsel | 296—62 |
| 1,485,355 | 2/1924 | Williamson | 280—164 |
| 2,433,169 | 12/1947 | Stephenson et al. | 296—37.2 |
| 2,481,230 | 9/1949 | McDonald | 296—62 |
| 3,347,589 | 10/1967 | Sirk | 296—23 |

LEO FRIAGLIA, Primary Examiner

R. R. SONG, Assistant Examiner

U.S. Cl. X.R.

280—166